3,126,417
NITRATION OF TOLUENE WITH ALKYL NITRATES AND POLYPHOSPHORIC ACID

Sien Moo Tsang, Bound Brook, N.J., assignor to American Cyanamid Company, New York, N.Y., a corporation of Maine
No Drawing. Filed Dec. 21, 1961, Ser. No. 161,244
4 Claims. (Cl. 260—645)

This invention relates to the mononitration of alkylbenzenes. More particularly, it relates to an improved process for the mononitration of an alkylbenzene such as toluene, whereby the mixture of isomeric mononitration products contains an unusually high content of the para-isomer and an unusually low content of ortho- and meta-isomers. Still more specifically, it is concerned with the use of alkyl nitrates in the presence of polyphosphoric acids to obtain this result.

For well over a hundred years, standard procedure for the nitration of toluene, as representing an illustrative alkylbenzene, has involved the use of a nitric acid-sulfuric acid mixture, commonly called "mixed acid." In such mononitration of toluene with "mixed acid," the usual distribution of isomers was shown to be about 58.5% ortho, 4.4% meta and 37.1% para; Jones and Russell, J. Chem. Soc. (1947) 921. This corresponds to an ortho:para isomer ratio of 1.58:1. Relative isomer distribution also has been found to vary but slightly with reaction temperature. For example, the ortho-nitrotoluene content varied from 58.21% to 58.33% at 60° C. and minus 30° C., respectively.

For many industrial purposes, the para-isomer is necessary. While with sufficient trouble it can be separated from the other isomers, the resultant yield from such an operation is undesirably low. In the past, a number of proposals have been made to increase the proportion of para-isomer in the mixed products; i.e., to decrease the ortho:para ratio. Several such proposals were found capable of reducing the ortho:para ratio, in some cases to as low as about 0.75:1.

Unfortunately, for a number of reasons, none of these proposals have been as widely accepted industrially as might be expected. Some proved exceedingly difficult to control on a production basis. Others resulted in relatively poor overall conversion. Many proved to be too expensive. Consequently, the old standby of using mixed acid has remained in common use despite its drawbacks.

There still remained a need for a process which is economically competitive with the mixed-acid process, yet will produce a low ortho:para ratio without loss in overall yield. It is a major object of this invention to provide such a process.

Such a process should be capable of producing a high yield of mixed mononitroalkylbenzenes in which the content of ortho and meta-isomers is minimized. In the present invention, this has been accomplished by using alkyl nitrates as the nitrating agents, carrying out the process in the presence of a polyphosphoric acid.

Of the above-noted prior proposals, perhaps one of the best is that shown in U.S. Patent No. 2,416,974. That procedure also utilized alkyl nitrates as alkylating agents. Reaction is done in the presence of concentrated sulfuric acid. This procedure is said to be capable of increasing the para-isomer content of the mixed mononitrotoluene products to about 43-44 percent.

However, successful operation of that process requires excessive care to be suitable for use in industrial production. The sulfuric acid concentration required is sufficiently high to produce sulfonation. Toluene cannot be allowed to remain in contact therewith in the absence of the nitric ester and the nitric ester cannot be mixed with the sulfuric acid with which it can react violently. Moreover, temperatures of some 40° C., or higher, are required. This is unfavorable to low production of the meta-isomer. In the past, to obtain meta-isomer contents below the above-noted normal production, it was necessary to use low temperatures with the corresponding lowering of reaction rates. Meta-isomer content is perhaps lowest at about 2.08% at 0° C., as reported by Roberts et al., J. Amer. Chem. Soc. (1958) 80, 4285; and 2.32% at minus 30° C., as reported by Jones and Russell (supra). A suitable process should not be too closely restricted as to its operating temperature range.

Surprisingly, the objects of the present invention have been accomplished far more successfully than has been previously found possible. According to the present invention, it has been found that toluene, for example, can be nitrated to give an excellent yield of mononitrotoluene mixture of substantially higher para-nitrotoluene content and lower ortho- and meta-nitrotoluene content than previously obtainable.

By proper selection of reaction conditions, the para-nitrotoluene content may be as high as 65% and the ortho- and meta-nitrotoluenes may be as low as 32.5% and 1.3%, respectively. As noted above, perhaps the best previous ortho:para ratio was about 0.75:1.0. In the process of this invention, a such lower ortho:para ratio is obtainable, in some cases as low as 0.49/1.0. This content of para-nitrotoluene in the mixed product is about 76% higher than the above-noted 37% usually expected in the mixed-acid process. It should be noted also that the meta-nitrotoluene content is simultaneously lowered to about 2.4%, appreciably lower than the normal 4.4% (supra) expected in the mixed-acid process.

As alkyl nitrates for use in the present invention, those containing from two to about five carbon atoms have been used successfully. Higher alkyls are less successful and those of about eight carbons or more are not satisfactory. Branched-chain alkyls are found to be generally preferable. Neopentyl nitrate, for example, contains five carbon atoms and has a maximum branching of the alkyl chain. It appears to be perhaps the most desirable. Other alkyl nitrates which may be used include ethyl, n-propyl, n-butyl, sec.-butyl, iso-butyl, tert.-butyl and the amyl nitrates. Alkyl nitrates having non-interfering substituents also may be used. For example, cyanosubstitution, as in 2-cyanoisopropyl nitrate, gives satisfactory results and is not objectionable. However, octafluoropentyl nitrate, for example, does not give good results.

No specific polyphosphoric acid is required, nor need for the acid to be highly pure. Excellent results have been obtained using a commercial polyphosphoric acid mixture such as that sold under the trade name of "Polyphos." This is an open-chain polyphosphoric acid, analyzing as equivalent to about 82–84% $P_4O_{10}$. The following formulae illustratively represent possible open-chain polyphosphoric acids.

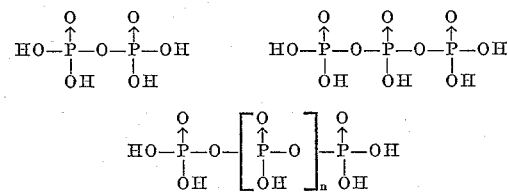

Commercial polyphosphoric acids are usually mixtures of different polymeric acids; i.e., mixtures of acids of the above formulae, with "$n$" representing various small whole numbers.

It is not definitely known which polymeric phosphoric acids are primarily responsible for the results obtained. A series of experiments using polyphosphoric acids of various degrees of polymerization was carried out. From these results, it appears that neither monomeric orthophosphoric acid nor cyclic trimeta-phosphoric acid is an active reagent for nitration. Polymers higher than dimers are effective. The useful range of $P_4O_{10}$ equivalency appears to be between about 76 and about 88%, with the preferred range being from about 82 to about 87%.

As to the amount of polyphosphoric acid to be used, it should be equivalent to at least one atom of phosporus per mole of alkyl nitrate, and preferably to at least two atoms of phosphorus per mole of alkyl nitrate. From two to about five atoms of phosphorus per mole of alkyl nitrate is a good general ratio for most purposes. Larger amounts of polyphosphoric acid appear to be slightly more beneficial but use of such larger excesses generally is uneconomical.

Unlike many prior proposals, the present process is quite flexible as to its range of useful reaction temperatures. Broadly, the reaction temperature may range from about 0° C. up to about the decomposition temperature of the alkyl nitrate used. At 0° C. polyphosphoric acid becomes very viscous and difficult to stir and the reaction rate is slow. Accordingly, a reaction temperature above about 10° C. is preferred. Temperatures in the range between about 10° C. and about 80° C. in general are found satisfactory.

An excess of toluene may be used as the reaction medium if necessary or desirable. Preferably, however, some inert solvent, such as n-hexane, should be used. Presence of a large excess of toluene causes the product nitrotoluenes to be contaminated with alkylated toluene from a side reaction. Other inert solvents which may be satisfactorily used include, for example, such aliphatic hydrocarbons as heptanes, octanes and the like; substituted aliphatic hydrocarbons such as chloroform and carbon tetrachloride and the like; such alicyclic hydrocarbons as cyclohexane and methylcyclohexane and such substituted benzenes such as the chlorobenzenes and nitrobenzenes.

Isolation of the mononitrotoluenes may be carried out by any of several well-known conventional methods. These steps are not considered to be part of the process of the present invention. Illustrations of several procedures are given in the examples. Therein all parts and percentages are by weight unless otherwise noted.

*Example 1*

To a mixture of 71.0 parts of commercial polyphosphoric acid (equivalent to 83% of $P_4O_{10}$) and 55.3 parts (0.60 mole) of toluene is added 20.0 parts (0.15 mole) of neopentyl nitrate over 3.5 hours while maintaining the temperature at 30°–32° C. After stirring for about 15 hours at 30° C. and for one hour at 40° C., the reaction mixture is poured into 300 parts of ice and water. The aqueous mixture is extracted with chloroform, and the chloroform extract, after washing with 5% aqueous sodium bicarbonate solution and with water, is dried and distilled. Yield of distilled mononitrotoluenes is 19.9 parts (96.8% of theory). By analysis, the ortho:para ratio is found to be 0.488/1.00.

*Example 2*

A solution of 20.0 parts (0.15 mole) of neopentyl nitrate in 13 parts of n-hexane is added over 15 minutes to 71.0 parts of commercial polyphosphoric acid at a temperature of 15° C. After stirring the mixture at 13°–16° C. for two hours, a solution of 13.8 parts (0.15 mole) of toluene in 13 parts of n-hexane is added over 30 minutes at 13°–16° C. The reaction mixture is stirred at 13°–15° C. for 2.5 hours and at 22°–24° C. for three days. The polyphosphoric phase is extracted with n-hexane and then poured onto 150 parts of ice. Resultant aqueous mixture is also extracted with n-hexane. The n-hexane solutions are combined, washed with 5% aqueous sodium bicarbonate and with water. Resultant mononitrotoluenes, isolated by distillation, contain 32.4% ortho, 2.4% meta and 65.2% para isomers. The ortho:para ratio is 0.496/1.00.

*Example 3*

To a mixture of 46.1 parts (0.5 mole) of toluene and 110.0 parts of polyphosphoric acid (equivalent to 83% $P_4O_{10}$) there is added 7.4 parts (0.062 mole) of tert.-butyl nitrate over 1.0 hour while keeping the temperature between 25° and 30° C. The reaction mixture is stirred for two hours at 25°–30° C. and then poured into 200 parts of ice and water. The nitrotoluenes are isolated by a procedure similar to that used in Example 1. The yield of mononitrotoluenes is 61.4% of theory, and the ortho:para ratio is 0.50/1.00.

*Example 4*

To a mixture of 46.1 parts (0.5 mole) of toluene and 99.3 parts of polyphosphoric acid (equivalent to 83% $P_4O_{10}$) is added 14.9 parts (0.125 mole) of sec.-butyl nitrate over 2.5 hours while keeping the temperature between 30° and 35° C. The reaction mixture is stirred at 40° C. for 2 hours and then poured into 250 parts of ice and water. The nitrotoluenes are isolated as in Example 1. The resulting mononitrotoluenes contain 3.02% of the meta isomer, and the ratio of ortho:para isomers is 0.59/1.00.

*Example 5*

To a mixture of 46.1 parts (0.5 mole) of toluene and 58.8 parts of polyphosphoric acid (equivalent to 83% $P_4O_{10}$) there is added 14.9 parts (0.125 mole) of n-butyl nitrate over one hour while keeping the temperature between 26° and 30° C. After the reaction mixture is stirred for two hours at 30°–35° C., it is poured into 250 parts of ice and water. The organic portion of the reaction mixture is separated and the aqueous portion is washed with carbon tetrachloride. The combined organic portion and carbon tetrachloride washes are washed with water, 10% aqueous sodium carbonate and water in that order. The organic solution is dried over anhydrous sodium sulfate and then distilled. The mononitrotoluenes contain 3.13% of the meta isomer, and have an ortho:para ratio of 0.67/1.00.

*Example 6*

To a mixture of 129 parts of polyphosphoric acid (equivalent to 83.0% $P_4O_{10}$) and 46.1 parts (0.5 mole) of toluene there is added 22.8 parts (0.25 mole) of ethyl nitrate over 6 hours while maintaining the temperature at 30°–32° C. for 2.5 hours and then at 40°–50° C. for 3.5 hours. Stirring is continued for about 16 hours at 20°–25° C., and the reaction mixture is then poured into a mixture of 150 parts of water and 240 parts of carbon tetrachloride. After stirring at 20°–25° C. for 4 hours, the carbon tetrachloride solution is separated, washed with aqueous sodium carbonate solution and distilled. The distilled mononitrotoluenes contain 2.7% of the meta isomer, and the ortho:para ratio is 0.58/1.00.

*Example 7*

To a mixture of 46.1 parts (0.5 mole) of toluene and 70.7 parts of polyphosphoric acid there is added 16.6 parts (0.125 mole) of primary amyl nitrate over one hour while keeping the temperature between 40° and 51° C. The reaction mixture is stirred for two hours at 40°–50° C. and then poured into 250 parts of ice and water. The nitrotoluenes are isolated as in Example 1. The yield of distilled mononitrotoluenes is about 85% of theory, and the product contains 6.62% of the meta isomer, while the ortho:para ratio is 0.64/1.00.

*Example 8*

To a mixture of 46.1 parts (0.5 mole) of toluene and 181.3 parts (0.472 mole) of polyphosphoric acid (equivalent to 83% $P_4O_{10}$) (average molecular weight of 384.8) is added over one minute 67.6 parts (0.508 mole)

of isoamyl nitrate at 28° C. After stirring at 40°–48° C. for about 16 hours, the reaction mixture is poured into 300 parts of ice and water. The nitrotoluenes are isolated as in Example 1. Yield of distilled mononitrotoluenes is about 92.3% of theory, the meta isomer content is 2.52% and the ortho:para ratio is 0.66/1.00.

*Example 9*

To a mixture of 47.5 parts (0.12 mole) of polyphosphoric acid (equivalent to 83% phosphoric acid anhydride) and 18.4 parts (0.20 mole) of toluene is added over 40 minutes at a temperature between 26° and 30° C. 13.0 parts (0.10 mole) of 2-cyanoisopropyl nitrate. After a stirring period wherein the temperature is gradually raised from 30° to 45° C., the reaction mixture is poured into 500 parts of ice and water. An extraction of the aqueous mixture with chloroform, with subsequent washings of the chloroform extract with solutions of sodium bicarbonate and water as previously described, is followed by a distillation of the mononitrotoluenes. The ortho:para ratio is 0.74/1.00 and the meta content is 1.48%.

*Example 10*

To a solution of 33.3 parts (0.25 mole) of primary amyl nitrate in 23.0 parts (0.25 mole) of toluene is added 46.0 parts (0.45 mole) of 96% sulfuric acid over 25 minutes at a temperature between 55° and 65° C. After stirring at 25°–30° C. for 45 minutes, the reaction mixture is poured into 150 parts of ice and water. The aqueous layer is separated and washed with carbon tetrachloride. The combined organic layer and carbon tetrachloride is washed with 10% aqueous sodium carbonate and then distilled. The distilled mononitrotoluenes have an ortho:para ratio of 1.42/1.00.

This example, as compared with Example 7, serves to show that the combination of alkyl nitrate and concentrated sulfuric acid does not give the desired low ortho: para ratio.

In the foregoing examples, toluene has been used as the illustrative alkylbenzene since it is the most commonly-encountered in industry. The invention, however, is not so limited. It is applicable to other alkylbenzenes in which the alkyl group contains about two to four carbon atoms. This is illustrated in the following examples.

*Example 11*

To a mixture of 10.6 parts (0.1 mole) of ethylbenzene and 50.8 parts of polyphosphoric acid (equivalent to 83.9% $P_4O_{10}$) there is added 14.0 parts (0.105 mole) of neopentyl nitrate over about one hour while keeping the temperature at 32°–35° C. After stirring the reaction mixture for 23 hours at 30°–35° C., it is poured onto 150 parts of ice, the mixture is extracted with chloroform, and the chloroform extract washed with 5% aqueous sodium bicarbonate. After drying over anhydrous sodium sulfate, the chloroform extract is distilled to recover the mononitroethylbenzenes. By analysis, the ortho:para ratio is 0.49:1. This compares favorably with a ratio of about 0.93:1 obtainable with the mixed acid procedure (Brown et al., J. Amer. Chem. Soc., 76, 605 (1954).

*Example 12*

To a mixture of 12.0 parts (0.1 mole) of isopropylbenzene and 50.8 parts of polyphosphoric acid (equivalent to 83.9% $P_4O_{10}$) is added 14.0 parts (0.105 mole) of neopentyl nitrate over one hour while keeping the temperature at 34°–36° C. Reaction is completed and the products separated as in Example 11. The mixed mononitroisopropylbenzenes (16.2 parts) are found by analysis to have an ortho:para ratio of 0.30. This is well below the 0.48:1 of Brown et al. (supra).

*Example 13*

To a mixture of 13.4 parts (0.1 mole) of tert.-butylbenzene and 50.8 parts of polyphosphoric acid is added 14.0 parts (0.105 mole) of neopentyl nitrate over about three hours while keeping the temperature at 34°–36° C. Reaction is completed and the products separated as in Example 11. Resultant mixed mononitro-tert.-butylbenzenes are found by analysis to have an ortho:para ratio of 0.19:1.

I claim:

1. The nitration process comprising reacting a lower alkylbenzene in the presence of an open-chain polyphosphoric acid having a phosphoric acid anhydride equivalency between about 76% and about 88% and at a temperature in the range from about 0° C. to about 80° C. with a lower alkyl nitrate having at least two carbon atoms.

2. The nitration process comprising reacting a lower alkylbenzene in which the alkyl contains 1–5 carbons in the presence of an open-chain polyphosphoric acid having a phosphoric acid anhydride equivalency of between about 82% and about 87%, with an alkyl nitrate of from two to five carbon atoms at a temperature in the range from about above 10° C. to about 80° C.

3. A process according to claim 2 in which the alkyl of the alkyl nitrate is a branched chain alkyl of at least three carbons.

4. A process according to claim 2 in which the alkyl of the alkyl nitrate is neopentyl.

References Cited in the file of this patent

UNITED STATES PATENTS 1,872,700    Dreyfus _____ Aug. 23, 1932

FOREIGN PATENTS 573,651    Great Britain _____ Nov. 29, 1945